United States Patent [19]

Tachibana et al.

[11] Patent Number: 4,739,546
[45] Date of Patent: Apr. 26, 1988

[54] LASER ELEMENT ASSEMBLY AND METHOD OF FABRICATING THE SAME

[75] Inventors: Susumu Tachibana, Odawara; Nobuo Suzuki, Fujisawa, both of Japan

[73] Assignee: Hitachi Ltd., Tokyo, Japan

[21] Appl. No.: 32,592

[22] Filed: Apr. 1, 1987

[30] Foreign Application Priority Data

Apr. 1, 1986 [JP] Japan .................................. 61-72447

[51] Int. Cl.$^4$ ........................................... B23Q 17/22
[52] U.S. Cl. ........................................ 29/407; 29/404; 29/464; 83/522; 350/320; 356/153; 357/17; 372/44; 372/109; 409/132
[58] Field of Search ................. 29/404, 407, 464, 593; 33/286, 568, 573, 645; 83/522; 350/320; 356/138, 153; 357/17, 74; 372/44, 109; 409/131, 132

[56] References Cited

U.S. PATENT DOCUMENTS

| 3,551,057 | 12/1970 | Hamilton et al. | 356/153 X |
| 3,672,778 | 6/1972 | Kern | 356/138 |
| 4,668,088 | 5/1987 | Quinque et al. | 356/138 |

FOREIGN PATENT DOCUMENTS

| 2430109 | 2/1980 | France | 356/153 |
| 111360 | 7/1983 | Japan | 357/74 |
| 177988 | 10/1984 | Japan | 372/109 |

*Primary Examiner*—P. W. Echols
*Assistant Examiner*—Andrew E. Rawlins
*Attorney, Agent, or Firm*—Antonelli, Terry & Wands

[57] ABSTRACT

A laser element assembly used in an optical disk apparatus or others is made up of a laser element for emitting a laser beam and a holder for holding the laser element, and it is required to set the traveling direction of the laser beam accurately to a desired direction when the laser element assembly is incorporated in the optical disk apparatus. In a laser element assembly according to the present invention, the laser emitting surface of the holder is made perpendicular to the traveling direction of the laser beam and is attached to the optical disk apparatus. Thus, the traveling direction of the laser beam can be accurately arranged in relation to a reference plane of the optical disk apparatus. Further, in a method of fabricating a laser element assembly in accordance with the present invention, a laser element is operated so as to emit a laser beam, and a machining operation is performed for the laser emitting surface of a holder in a state that the laser beam is emitted from the laser element, to make the laser emitting surface perpendicular to the traveling direction of the laser beam.

4 Claims, 3 Drawing Sheets

LASER ELEMENT ASSEMBLY AND METHOD OF FABRICATING THE SAME

BACKGROUND OF THE INVENTION

The present invention relates to a laser element assembly and a method of fabricating the laser element assembly. For example, a laser diode assembly used as the light source of an optical disk apparatus or others includes a laser diode and a holder for holding the laser diode, and is mounted on the optical disk apparatus or others so that a laser beam emitted from the laser diode travels in a desired direction. The present invention relates particularly to a laser element assembly which can be mounted on an optical disk apparatus or others so that a laser beam emitted from a laser element travels in a desired direction, and a method of fabricating such a laser element assembly.

A conventional laser diode assembly, as shown in FIG. 4, includes a laser diode 1, a holder 4 for holding the laser diode 1, and a joint 5. The holder 4 and the joint 5 are used to adjust the traveling direction of a laser beam emitted from the laser diode 1. The holder 4 has a spherical front surface, which is rotatably fitted in the joint 5. The holder 4 is rotated so that the traveling direction of the laser beam is perpendicular to a reference surface 3 of the laser diode assembly, and then fixed to the joint 5.

In the laser diode assembly having the above structure, the rotating position of the holder 4 is finely adjusted manually so that the laser beam travels in a direction perpendicular to the reference surface 3, and such adjustment requires a lot of time. Further, after the above adjustment, the rotating position of the holder 4 may vary with time and temperature. Thus, the optical axis of the laser diode assembly may deviate from a desired direction.

A laser diode assembly incorporated in an optical disk apparatus is disclosed in, for example, U.S. Pat. No. 4,416,001. This patent, however, fails to indicate how the traveling direction of the laser beam is adjusted in the laser diode assembly.

SUMMARY OF THE INVENTION

It is a first object of the present invention to provide a laser element assembly which can be mounted on an optical disk apparatus or others in a state that the traveling direction of a laser beam is perpendicular to a reference plane.

It is a second object of the present invention to provide a method of fabricating the above laser element assembly.

In order to attain the first object, according to the present invention, there is provided a laser element assembly, in which the laser emitting surface of a holder mounted with a laser element is made perpendicular to the traveling direction of a laser beam emitted from the laser element.

Further, in order to attain the second object, according to the present invention, there is provided a laser-element-assembly fabricating method, in which after a laser element is mounted in a holder, the laser element is operated so as to emit a laser beam, and a cutting operation is performed for the laser emitting surface of the holder in a state that the laser beam is emitted, to make the laser emitting surface of the holder perpendicular to the traveling direction of the laser beam.

DESCRIPTION OF THE PREFERRED EMBODIMENTS

Figure 1:
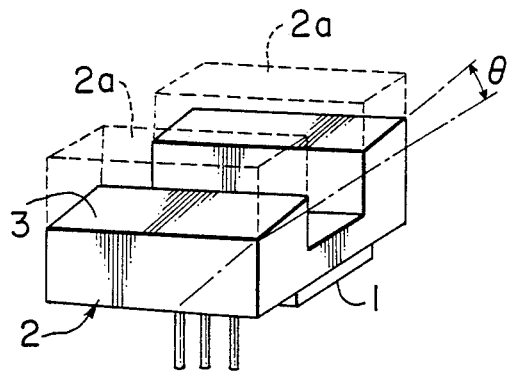
FIGS. 1 and 2 are perspective and side views showing an embodiment of a laser element assembly according to the present invention, respectively.
Figure 2:
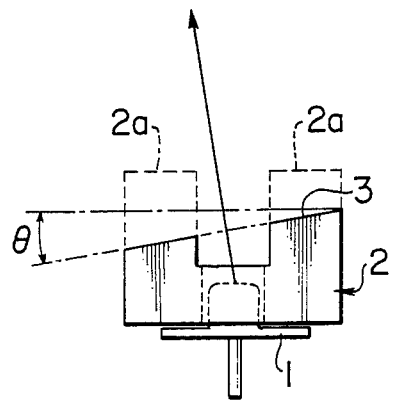
Figure 4:
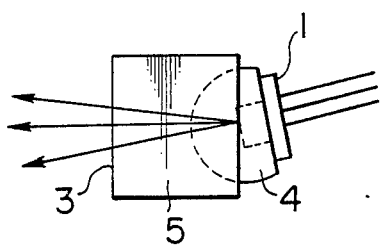
FIG. 4 is a side view showing a conventional laser diode assembly.

First, an embodiment of a laser element assembly according to the present invention will be explained, with reference to the drawings. FIGS. 1 and 2 are perspective and side views showing the embodiment, respectively. Referring to FIGS. 1 and 2, the present embodiment is made up of a laser diode 1 for emitting a laser beam and a holder 2 having a groove which is formed so that the cross section of the holder perpendicular to the groove has the form of a character U. The holder 2 has a bottom provided with a through hole, into which the laser diode 1 is inserted, and has a reference surface 3 attached to an optical disc apparatus or others. The reference surface 3 of the holder 2 is made perpendicular to the traveling direction of the laser beam by a machining operation (for example, a cutting operation). At first, the holder 2 has an upper surface parallel to the bottom surface. The cutting operation is performed for the upper surface so that portions 2a of the holder 2 are removed and the reference surface 3 is obtained. The reference surface 3 perpendicular to the traveling direction of the laser beam is formed for the following reason. When the laser diode 1 has been mounted in the holder 2, the upper surface of the holder 2 is not necessarily perpendicular to the traveling direction of the laser beam, because of an unavoidable mounting error and variations in characteristic of laser diode. In view of this fact, the present invention is based upon a novel technical thought. That is, unlike a conventional technical thought that the mounting of the laser diode holder in the joint is adjusted so that the traveling direction of the laser beam is perpendicular to a reference surface, the laser emitting surface of a laser element assembly according to the present invention is subjected to a cutting operation, to form the reference surface perpendicular to the traveling direction of the laser beam.

Figure 3:
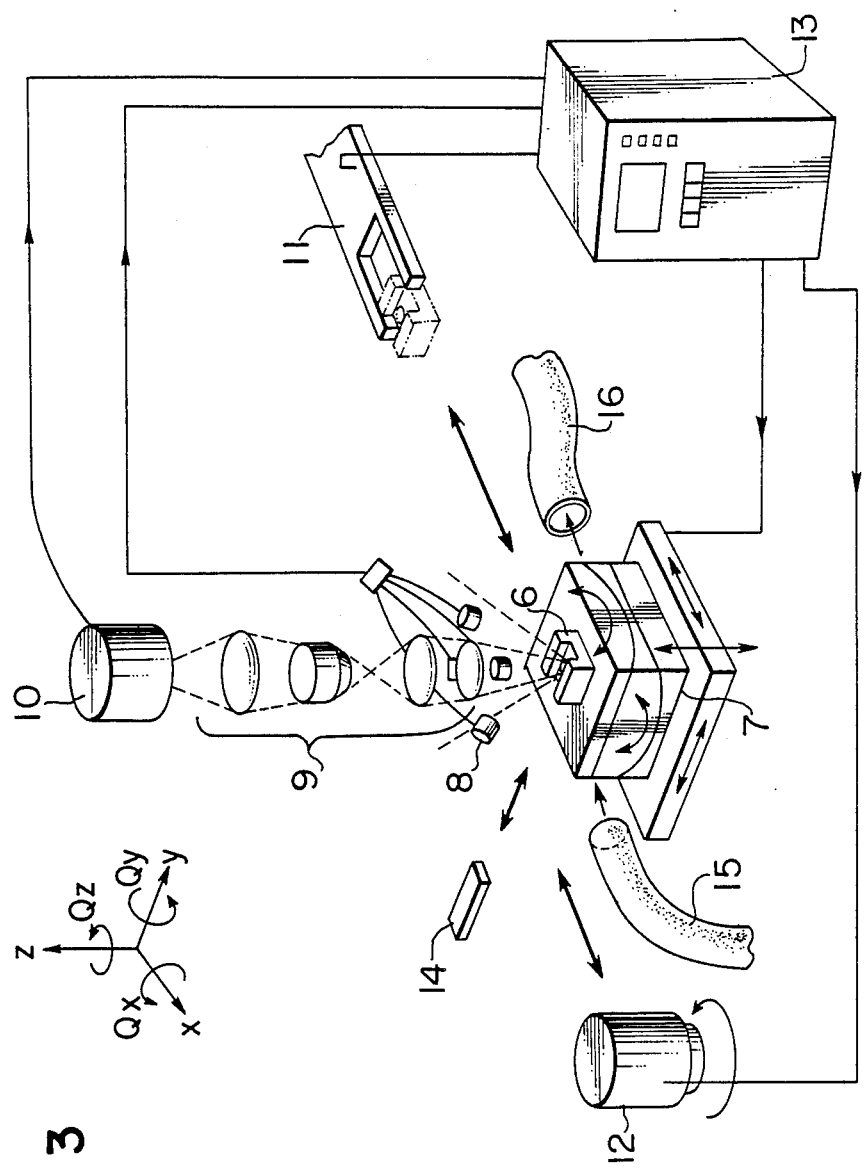
FIG. 3 is a schematic diagram showing an apparatus for forming a reference surface of the embodiment of FIGS. 1 and 2.

The reference surface 3 of the laser diode assembly of FIGS. 1 and 2 can be formed by an apparatus shown in FIG. 3.

Figure 5:
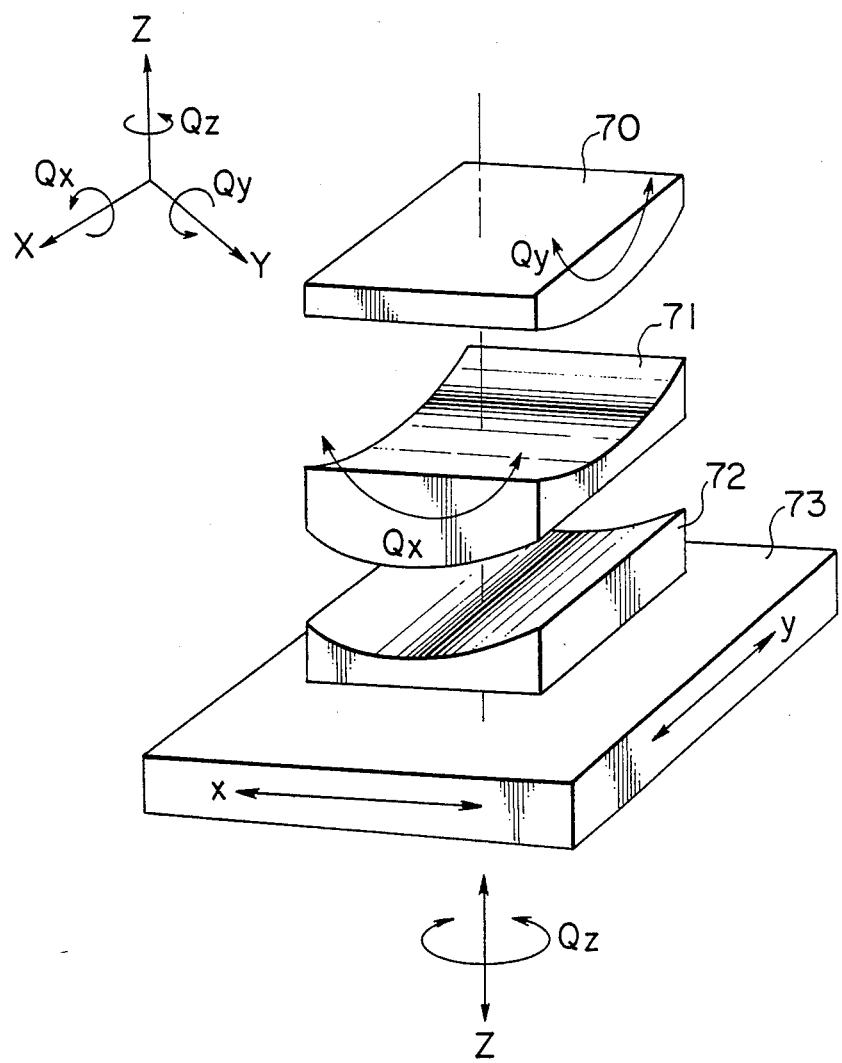
FIG. 5 is an exploded view for explaining the operation of the gimbals of FIG. 3.

Referring to FIG. 3, the reference-surface forming apparatus includes gimbals 7 loaded with a laser diode assembly 6 for adjusting the traveling direction of a laser beam emitted from the laser diode 1 of the assembly 6, a plurality of photodiodes (for example, four photodiodes) 8 arranged in accordance with the intensity distribution in the laser beam for detecting the traveling direction of the laser beam, a measuring optical system 9 formed of a lens system for detecting the laser beam emitted from the laser diode 1, a position sensor 10 for detecting the emission center of the laser diode 1 with the aid of the measuring optical system 9, a loader 11 for mounting the laser diode assembly 6 on the gimbals 7, a cutting tool 12 for performing a cutting operation for the laser diode assembly 6 to form the reference surface 3, a control unit 13 applied with the output signals of the photodiodes 8 and the position sensor 10 for controlling the gimbals 7, the loader 11, the cutting tool 12 and others, a dust-proof member (that is, a dust plate) 14 inserted into the groove of the laser diode assembly 6 when the cutting operation is performed, and a chip removing device made up of a fan engine 15 and a chip sucking mechanism 16. The gimbals 7 has such a structure as shown in FIG. 5. That is, the gimbals 7 includes a first rotating part 70 which is loaded with the laser diode assembly 6 and can rotate in directions $Q_y$ indicated with arrows, a second rotating part 71 which is loaded with the first rotating part 70 and can rotate in directions $Q_x$ indicated with arrows, a rotor supporting part 72 loaded with the second rotating part 71, and a table 73 loaded with the rotor supporting part 72. The table 73 can move in each of X-, Y- and Z-directions, and also can rotate in directions $Q_z$ indicated with arrows, that is, can rotate about a Z-axis. By rotating the part 70, the part 71 and the table 73 in the directions $Q_x$, $Q_y$ and $Q_z$, respectively, and by moving the table 73 in the X-, Y- and Z-directions, the laser diode assembly 6 mounted on the first rotating part 70 can be rotated in all directions and can be moved to a desired position.

Now, an embodiment of a method of fabricating the laser diode assembly of FIGS. 1 and 2 will be explained below.

At first, the laser diode assembly 6 made up of the laser diode 1 and the holder 2 is mounted on the gimbals 7 at a predetermined position thereon. Then, the laser diode 1 is operated by the control unit 13 so as to emit a laser beam. The laser beam passes through the measuring optical system 9 and is then received by the position sensor 10, to detect the emission center of the assembly 6. On the basis of an output signal from the position sensor 10, the control unit 13 controls the position of the gimbals 7, that is, moves the gimbals in the X-, Y- and Z-directions so that the emission center of the assembly 6 coincides with a reference position with respect to the measuring optical system 9. Next, the traveling direction of the laser beam is adjusted with the aid of four photodiodes. That is, on the basis of the output signals of the photodiodes 8, the control unit 13 varies the rotating position of the gimbals 7 in the directions $Q_x$ and $Q_y$ so that the output signals of the photodiodes 8 have the same level. Thus, the traveling direction of the laser beam is made coincident with a reference direction with respect to the measuring optical system 9. Next, the cutting tool 12 is moved in a direction perpendicular to the above reference direction while being rotated, to reach the laser diode assembly, and then performs a cutting operation for the upper surface of the holder 2 in a state that the dust-proof member (that is, the dust plate) 14 is inserted in the groove of the holder 2, to form the reference surface 3. By the above fabrication steps, the reference surface 3 of the laser diode assembly 6 is formed which is perpendicular to the traveling direction of the laser beam.

As is evident from the above description, the reference-surface forming apparatus of FIG. 3 includes a measuring system which is made up of the gimbals 7, the photodiodes 8, the measuring optical system 9, the position sensor 10 and the control unit 13, and also includes a machining system which is made up of the gimbals 7, the cutting tool 12, the control unit 13, the dust-proof member 14, the fan engine 15 and the chip sucking mechanism 16.

As has been explained in the foregoing, in a laser diode assembly according to the present invention and a method of fabricating the laser diode assembly, the reference surface of the assembly which is made up of a holder and a laser diode fixed to the holder, is made perpendicular to the traveling direction of the laser beam emitted from the laser diode, through a cutting process. In the prior art, the mounting of the laser diode holder in the joint is adjusted so that the traveling direction of the laser beam is perpendicular to the reference surface of the laser diode assembly, and then the holder is fixed to the joint. According to the present invention, such time-consuming manual labor is eliminated, and thus workability is improved. Further, the conventional laser diode assembly is provided with two high-accuracy alignment bearing means, in order to bi-axially adjust the mounting of the holder in the joint. While, a laser diode assembly according to the present invention requires only one simple holder besides a laser diode. Thus, according to the present invention, the quality of a laser diode assembly incorporated in the optical head of an optical disk apparatus can be improved, and moreover the costs of parts included in the assembly can be reduced.

We claim:

1. A method of fabricating a laser element assembly, the laser element assembly being made up of a laser element for generating a laser beam and a holder for holding the laser element, the holder having a first surface and a second surface opposite thereto, the laser element being mounted on the first surface of the holder, a through hole being bored in the holder from the first surface to the second surface, a laser emitting part of the laser element being inserted in the through hole so that the laser beam passes through the through hole, said method comprising the steps of:

inserting the laser emitting part of the laser element into the through hole of the holder from the first surface thereof, and fixing said laser element to said holder;

operating said laser element to generate the laser beam at said laser emitting part;

detecting the emission center of said laser element to place said emission center at a predetermined position;

detecting the traveling direction of the laser beam emitted from said emission center of said laser element; and performing a cutting operation on said holder so that said second surface is formed perpendicular to the traveling direction of the laser beam emitted from said emission center.

2. A method of fabricating a laser element assembly as claimed in claim 1, wherein said cutting operation is preformed on said holder in a state that said laser element is covered with a protective member.

3. A method of fabricating a laser element assembly as claimed in claim 2, wherein said cutting operation is performed on said holder in a state that chips cut out from said holder can be removed.

4. A method of fabricating a laser element assembly as claimed in claim 1, wherein said laser element assembly is held movably in X-, Y- and Z-directions and rotatably about the X-, Y- and Z-directions to make the traveling direction of said laser beam coincident with a predetermined direction, and said cutting operation is performed on said holder so that said second surface is formed perpendicular to said predetermined direction.

* * * * *